United States Patent [19]

Patzschke et al.

[11] 4,101,495
[45] Jul. 18, 1978

[54] MODIFIED WATER-DILUTABLE DIOLEFIN POLYMER OILS CONTAINING CARBOXYL GROUPS

[75] Inventors: Hans-Peter Patzschke; Armin Göbel, both of Wuppertal, Fed. Rep. of Germany

[73] Assignee: Dr. Kurt Herberts & Co. Gesellschaft mit beschrankter Haftung vorm. Otto Louis Herberts, Wuppertal, Fed. Rep. of Germany

[21] Appl. No.: 636,369

[22] Filed: Dec. 1, 1975

[30] Foreign Application Priority Data

Dec. 2, 1974 [AT] Austria .............................. 129609/74

[51] Int. Cl.$^2$ ............................................. C08L 47/00
[52] U.S. Cl. .................. 260/29.7 NR; 260/5; 260/29.7 D; 260/894; 526/20

[58] Field of Search .................. 260/29.7 D, 29.7 NR, 260/894, 5; 106/287; 526/20

[56] References Cited

U.S. PATENT DOCUMENTS

| | | | |
|---|---|---|---|
| 2,634,256 | 4/1953 | Sparks et al. | 260/78.4 |
| 3,005,800 | 10/1961 | Powers et al. | 260/78.4 |
| 3,365,411 | 1/1968 | Mertzweiller et al. | 260/29.7 |
| 3,920,769 | 11/1975 | Yaginuma et al. | 260/894 |

*Primary Examiner*—Harold D. Anderson
*Assistant Examiner*—E. A. Nielsen
*Attorney, Agent, or Firm*—Donald D. Jeffery

[57] ABSTRACT

Disclosed are modified olefin polymer oils containing carboxyl groups, a method for preparing the modified polymer oils and aqueous coating compositions, preferably electro-dip-lacquering compositions, containing same.

17 Claims, No Drawings

MODIFIED WATER-DILUTABLE DIOLEFIN POLYMER OILS CONTAINING CARBOXYL GROUPS

BACKGROUND OF THE INVENTION

This invention relates to modified, water-dilutable olefin polymer oils containing carboxyl groups which are obtained by reacting α,β-unsaturated monocarboxylic and/or dicarboxylic acids or their anhydrides, (semi) esters and/or (simi)amides, more especially maleic acid anhydride, with olefin polymer oils substantially free from carboxyl groups. The invention also relates to a process for producing the aforementioned modified olefin polymer oils. Finally, the invention relates to aqueous coating compositions, more especially for electro-dip lacquering, which contain the aforementioned modified olefin polymer oils as binders. These aqueous coating compositions are produced by neutralising the aforementioned modified olefin polymer oils with a base and gradually diluting them with more water, or optionally in conjunction with solvents.

The increasing demands which electro-dip-lacquers are called upon to satisfy, especially with regard to converage and protection against corrosion, are forcing the lacquer industry to turn away from the hitherto conventional, modified natural oil products. Protection against corrosion can be improved by using modified, water-dilutable olefin polymer oils which are not hydrolysable. These olefin polymer oils are preferably conjugated diolefin polymer oils which are reacted with α,β-unsaturated carboxylic acids, such as acrylic acid or maleic acid anhydride, and reach a high level of water solubility by salt formation (cf. German Pat. No. 1,026,900 and U.S. Pat. No. 2,634,256, column 6, lines 67–68). Maleinised products which are unsuitable for electro-dip-coating are obtained by the methods described in these patents. Excessive viscosities in conjunction with inadequate acid numbers have such an adverse effect upon the electrical properties (deposition voltage, bath conductivity, layer resistance) of the lacquer that it is not possible to obtain optimum coating results.

German Auslegeschrift (DAS) No. 1,929,593 and German Offenlegungschrift (DOS) No. 2,120,962 describe the use of maleinised butadiene oils with water-soluble phenolic resins. According to the examples of these two specifications, very low deposition voltages are applied (100 to 150 volts for a layer thickness of 26 to 28μ with a deposition temperature of 25° C, and a coating time of 1 minute), which gives inadequate coverage. A reduction of the high phenolic resin content is desirable not only for improving the mechanical and corrosion-inhibiting properties (cf. DOS No. 1,120,962, page 3, lines 30 to 31), but also for improving environmental conditions.

SUMMARY OF THE INVENTION

It is therefore an object of the present invention to provide modified, water-dilutable olefin polymer oils containing carboxyl groups which have the favorable properties referred to above and which can be deposited at high voltages while, at the same time, affording effective protection against corrosion and showing improved elasticity.

Accordingly, the present invention relates to modified, water-dilutable olefin polymer oils containing carboxyl groups which are obtained by reacting α,β-unsaturated monocarboxylic and/or dicarboxylic acids or their anhydrides, (semi)esters and/or (semi)amides, more especially maleic acid anhydride, with olefin polymer oils substantially free from carboxyl groups, and which are distinguished by the fact that they are produced by heating A. the reaction product of one or more of the α,β-unsaturated monocarboxylic and/or dicarboxylic acids or their anhydrides, (semi)esters and/or (semi)amides and, optionally, imides with a mixture containing
  a. 80 to 99 parts by weight, more especially 85 to 95 parts by weight, of a substantially carboxyl-group-free olefin polymer oil with an average molecular weight of from 500 to 2500,
  b. 1 to 20 parts by weight, more especially 5 to 15 parts by weight, of a substantially carboxyl-group-free olefin polymer oil, degraded rubber, liquid butadiene copolymer and/or readily soluble diolefin block copolymer with an average molecular weight of from 4500 to 20,000, with B. 3 to 15 parts by weight, more especially 6 to 12 parts by weight, based on 100 parts by weight of component A, of a liquid, substantially carboxyl-group-free olefin polymer oil which has not been reacted with α,β-unsaturated monocarboxylic and/or dicarboxylic acids or their anhydrides, (semi) esters and/or (semi) amides and, optionally, imides, and which average molecular weight is between the average molecular weights of compoents (Aa) and (Ab).

The present invention also relates to a process for producing the aforementioned modified, water-dilutable olefin polymer oils containing carboxyl groups, which comprises the steps of reacting at an elevated temperature A. a reaction product of 1 or more of the α,β-unsaturated monocarboxylic and/or dicarboxylic acids or their anhydrides, (semi) esters and/or (semi) amides and, optionally, imides with a mixture containing
  a. 80 to 99 parts by weight, more especially 85 to 95 parts by weight, of a substantially carboxyl-group-free olefin polymer oil with an average molecular weight of from 500 to 2500,
  b. 1 to 20 parts by weight, more especially 5 to 15 parts by weight, of a substantially carboxyl-group-free olefin polymer oil, degraded rubber, liquid butadiene copolymer and/or readily soluble diolefin block copolymer with an average molecular weight of from 4500 to 20,000, with B. 3 to 15 parts by weight, more especially 6 to 12 parts by weight, based on 100 parts by weight of component A, of a liquid, substantially carboxyl-group-free olefin polymer oil which has not been reacted with α,β-unsaturated monocarboxylic and/or dicarboxylic acids or their anhydrides, (semi)esters and/or (semi) amides, and, optionally, imides, and whose average molecular weight is between the average molecular weights of components (Aa) and (Ab).

In addition, the present invention relates to an aqueous coating composition, more especially for electro-dip-lacquering containing a binder which can be diluted with water by neutralisation with a base and, optionally, organic solvents. The coating composition according to the invention is distinguished by the fact that it contains as binder modified, water-dilutable olefin polymer oils containing carboxyl groups corresponding to the above definition and, optionally, other compatible synthetic resins.

The average molecular weight of the substantially carboxyl-group-free olefin polymer oils of component (Aa) is preferably above 800 and, with particular preference, above 1000, and is preferably below 2000 and, with particular preference, below 1750. The average molecular weight of the substantially carboxyl-group-free olefin polymer oils of component (Ab) preferably amounts to at least about 5000 and, with particular preference, to at least about 6000, and preferably amounts to at most about 15,000 and, with particular preference, to at most about 10,000.

Further objects, features and advantages will become apparent from the description of preferred embodiments which follows.

DESCRIPTION OF THE PREFERRED EMBODIMENTS

The coating compositions according to the invention may be produced in stable, pigmented or unpigmented form and may be applied by any of the usual methods. They are particularly suitable for electro-dip-lacquering, forming readily pigmentable lacquers and highly fluid films which become insoluble in water immediately after their deposition at high voltages. By comparison with the prior art, it is extremely surprising that, in cases where the coating compositions according to the invention are used, it is possible to apply extremely high deposition voltages of, for example, more than 300 volts to, for example, 500 volts. For a bath temperature of 30° C and a coating time of 2 minutes, a coating with a dry film layer thickness of about 25 $\mu$ is obtained in this way. Films which are highly resistant to corrosion by salt mists and industrial atmospheres are obtained after stoving. One particular advantage of these coatings is that they provide even non-pretreated iron surfaces with extremely effective protection against corrosion. By virtue of this factor, imperfections in the quality of the metal substrate and in the pretreatment (cleaning, phosphatising) are covered more effectively by the stoved lacquer films.

In the context of the invention, olefin polymer oils substantially free from carboxyl groups are the products hitherto used in this technical field, the particular molecular weight indicated being of particular importance in accordance with the invention. As known from the prior art, olefin polymer oils are reaction products of conjugated dienes, for example of 1,3-butadiene and/or 2-methyl-1,3-butadiene (isoprene) and/or 2,3-dimethyl-1,3-butadiene and/or chloroprene etc., optionally with other copolymerisable monomers such as styrene, $\alpha$-methyl styrene, (meth)acrylonitrile (meth)acrylic acid esters, vinyl esters, vinyl ethers, vinyl ketones, etc. The chain ends may contain carboxyl groups emanating from chain terminators.

The polymers contain predominantly isolated double bonds which optionally may be partially hydrogenated. The deposition voltages obtained are unaffected by the configuration of the olefin polymers (1.4-cis, 1.4-trans. 1,2-vinyl) which are a function of the catalyst used and of the temperature and pressure applied during production of the olefin polymer oil. As is known to the expert, the choice of the suitable olefin polymer oils substantially free from carboxyl groups is determined by the required mechanical properties which the coating ultimately produced is intended to have. 1,4-cis-polybutadiene oils are preferably used as component (Aa) corresponding to the above definition and/or as component (B). These are well known in the art and include polybutadienes having greater than about 40% cis-1,4 configuration (Römpp, Chemie Lexikon, 6th edition, column 5032).

Component (Ab), i.e. the high molecular weight polymer, may be an olefin polymer oil substantially free from hydroxyl groups, a degraded, i.e. depolymerised natural rubber, a depolymerised butadiene rubber, a readily soluble diolefin block copolymer, such as styrene-butadiene and styrene-isoprene block copolymers, a liquid butadiene copolymer, such as liquid acrylonitrile rubber, liquid butyl rubber, etc.

It is particularly preferred to use a combination of 1,4-cis-polybutadiene oil as components (Aa) and (B) with degraded rubber as component (Ab). The high deposition voltages which can be obtained are attributable to the high electrical resistance which is in turn attributable to the presence of maleinised high molecular weight product in the deposited film.

Examples of suitable $\alpha,\beta$-unsaturated carboxylic acids are (meth)acrylic acid, maleic acid, maleic acid anhydride, fumaric acid, itaconic acid, etc. The proportion of maleic acid anhydride preferably incorporated is within the limits, known from the maleinate oils, of about 10 to 30% by weight, more especially 16 to 20% by weight. The production of suitable diene homopolymers or copolymers and their maleinisation is known per se. In order to avoid gelation during maleinisation, it is necessary to add from 0.01 to 1.0% by weight of an inhibitor, optionally in conjunction with about 10% by weight of an aromatic solvent, preferably xylene. Suitable inhibitors are aryl amines, such as diphenyl amine, naphthyl amine or p-phenylene diamine derivatives, and/or sterically hindered phenols, such as 2,6-di-tert.-butyl-4-methyl phenol or 2,4-dimethyl-6-tert-butyl-phenol and/or tris-nonyl phenyl phosphite. Although the tendency towards gelation is suppressed most effectively with amine-based inhibitors, the reaction products obtained are darker than those obtained with phenols or with the phosphite. Copper compounds give unusable products. As is known to the artisan, the reaction is best carried out in an inert gas atmosphere. The maleinisation temperature is in the range from about 180° to 260° C and more especially in the range from 190° to 200° C.

In order to destroy acid(anhydride)residues in the reaction products according to (A) of the above definition, boiling is carried out with about 3 to 15 parts by weight and more especially with 6 to 12 parts by weight of a liquid olefin polymer oil of the type defined above, partial grafting-on resulting in the formation of emulsifier-like molecules which are responsible for the stability of the coating composition subsequently produced. At the same time, it is possible, without having to reduce the high deposition voltage, to keep the viscosity of the material in a processible range and, hence, to guarantee good levelling and high pigmentability of the coating composition. Any xylene present is distilled off in vacuo.

In cases where a maleinised butadiene oil with a maleic acid anhydride content of from 20 to 30% by weight is used, it is advisable to reduce the excessively high acid number by semi-esterification, semi-amidation and/or imide formation. Semi-esterification is best carried out with monoalcohols at temperatures between 120° and 250° C with reflux cooling. The reaction may be accelerated by catalysts, such as tertiary amines. Suitable monoalcohols are, for example, any lower alkanols such as methanol, ethanol, isopropanol, sec-butanol, or aromatic alcohols such as benzylalcohol, and also semi-ethers of ethylene and propylene glycol.

In another embodiment of the invention, the reaction products according to (A) may contain imide groups. This result may be obtained by using at least partly $\alpha,\beta$-unsaturated dicarboxylic acid imides as starting products and/or by reacting the reaction products according to (A) with imide-forming substances. Such imide-forming substances are preferably ammonia, compounds which give off ammonia under the reaction conditions, primary amines or amides, especially urea. The N-substituted monoamides initially formed are thermally decomposed at temperatures above 80° C, more especially at temperatures above 120° C, until no more carbon dioxide is given off. This reaction is best carried out in the presence of solvents, such as xylene, ketones, dimethyl formamide, relatively high boiling petrols or optionally chlorinated hydrocarbons. In order to complete the reaction after abatement of the initially vigorous evolution of $CO_2$, the reaction temperature may be increased to around 250° C. The water of reaction formed is distilled off with the solvent, optionally in vacuo. The reaction with urea is carried out in such a way as to obtain acid numbers suitable for producing adequate dilutability with water. The anhydride may have to be partially hydrolysed with water before the reaction with urea.

Boiling in accordance with (B) of the above definition is best carried out at a temperature in the range from 120° to 200° C and preferably at a temperature in the range from 140° to 170° C until a viscosity of about 0.2 to 5 Pas, more especially from 0.4 to 2 Pas, as measured on a 60% solution in p-xylene at 25° C, is obtained. The suitable final viscosity may be reached by co-ordinating the maleic acid content and the quantity of high molecular weight olefin polymers. Where high acid numbers, i.e. a high maleic acid content, are required, the desired viscosities may be reached with a smaller quantity of high molecular weight compounds than in the opposite case. The acid numbers of the end product should be in the range from 100 to 220. Particularly favorable properties of the stoved coatings are obtained in cases where water-dilutable systems with acid numbers of from 140 to 190 are used. In choosing the components, it is important to remember that the emulsion character of the coating composition should not be overemphasised, either by an excessively high content of compounds of component (B) or by an excessively high molecular weight of the compounds by component (B) or (Ab), because the high deposition voltages can be reduced in this way.

A water-dilutable coating composition is prepared from the reaction products thus obtained in the usual way by neutralisation with bases and gradual dilution with distilled or deionised water, optionally in conjunction with suitable co-solvents. It is important to ensure that dilution to a lower solids content is carried out gradually so as to avoid non-dissolvable coagulates or precipitation phenomena during ageing. In practice, the individual steps are largely determined by the concentrated acid refill material and by mixing in of the concentrate in the premixing vessel on the coating tank.

In order to modify their service properties, the modified, water-dilutable olefin polymer oils according to the invention may be mixed to a limited extent, i.e. in a quantity of at most 20% by weight, preferably in a quantity of at most 15% by weight and, with particular preference, in a quantity of at most 10% by weight, based on the total weight of the binder, with maleinate resins, colophony esters, coumarone-indene resins, polycyclopentadiene resins, cyclized rubber, phenol-formaldehyde resins, amine-formaldehyde resins, styrene-allyl alcohol copolymers and their esters, epoxy compounds and corresponding epoxy esters, (meth)acrylic acid ester copolymers, ketone and aldehyde resins, polyvinyl ethers, maleic acid anhydride copolymers of vinyl ethers, vinyl ketones, vinyl esters, ethylene, etc. the limit to the "chargeability" of the coating composition being greatly increased by an increased acid number of the base resin and by avoiding a precipitation shock during dilution with water. The various synthetic resin components in the coating composition may optionally be incorporated more strongly into the molecular structure by precondensation.

In the practical application of the coating compositions according to the invention, a tank in which coating is carried out is initially filled with the adequately diluted coating composition. In view of the consumption of binder during the operation of this tank, the tank has to be refilled with a binder concentrate. This binder concentrate for the refill material may be prepared for example in two ways:

1. by pre-hydrolysing anhydride groups present by adding water in a slight stoichiometric excess at temperatures in the range from about 80° to 120° C, optionally under pressure, and subsequently adding alcohol or glycolic solvents to a solids content of from 70 to 90% by weight;

2. by pre-hydrolysis with water as in 1, accompanied or followed by addition of the quantity of base required for the acid refill material. Further dilution with water to a solids content of from 60 to 80% by weight is carried out by dividing the total quantity of water substantially into portions which correspond to a geometric series.

Organic solvents and antioxidants and any other additives required, such as crosslinking aids, are added in the last stage or during pigmenting. These concentrates are suitable for pigmenting on suitable units, such as three-roll stands or sand mills.

The baths are stabilised against ageing by the addition of phenolic inhibitors such as hydroquinone, 2,6-ditert.-butyl-4-methyl phenol, 2,4-dimenthyl-6-tert.-butyl-phenol, or by the addition of aromatic amines, such as phenyl naphthyl amine, diphenyl amine of p-phenylene diamine derivatives or tris-nonyl phenyl phosphite. The advantage of the amine-based inhibitors is that they are only co-deposited on the anode to a limited extent and, as a result, do not interfere with drying of the film.

The films are crosslinked largely by thermal reaction of the unsaturated polymers, supported by the oxidative influence of air. As is the case with comparable conventional coating compositions, the crosslinking density may be increased by the addition of, for example, metal siccatives, radical formers or vulcanisation accelerators. By adding from 0.01 to 2% by weight, based on metal, of salts of cobalt, manganese, iron, lead, etc. with ethyl hexanoic acid, naphthenic acid or resinic acids, it is possible to reduce the stoving temperature and to obtain harder films affording effective protection against corrosion. In some cases, it is of advantage to add radical-forming additives, such as peroxides, hydroperoxides or peresters, the choice of being governed by the requisite decomposition temperature. By adding vulcanisation accelerators, such as thiuram sulphides or quinone dioxime derivatives, optionally in conjunction with small quantities of sulphur, it is possible to improve the hardness and, in particular, the elasticity of the stoved film.

Bases suitable for neutralising the products according to the invention are the same bases which are normally used in this field. Examples of these bases, in addition to ammonia, are primary, secondary and tertiary alkyl amines, for example diethyl amine, triethyl amine, morpholine, also aklanolamines such as diisopropanolamine, triethanolamine, quarternary ammonium hydroxides, such as triethyl benzyl ammonium hydroxide or, in small quantities, even alkylene polyamines such as ethylene diamine or diethylene triamine. It is known that some amine neutralising agents can influence the mechanical stability of the aqueous dispersion. Volatile nitrogen bases are preferred, although it is also possible to use non-volatile bases, for example, lithium, sodium and potassium, in the form of hydroxides or alkali salts, for example carbonates.

Because base accumulates in a continuously operated coating tank, the concentrated refill material is only neutralised to a limited extent, for example to an MEQ value of 0 to 25. The MEQ value is the quantity of amine in milliequivalents per 100 g of solid resin. To prepare a fresh bath material, distilled or deionised water and additional amine are added for dilution to a solids content of from 10 to 15% by weight. In general, as much base is added as the reaction product of polymer oil and carboxylic acid needs to form a stable dispersion in water. The base is preferably used in a stoichiometric deficit, based on the carboxyl functions of the reaction product, because excessively large quantities of amine produce surface irregularities. The degree of neutralisation best amounts to between 30 and 80% of the free and potential carboxyl groups present. The pH-value of the neutralised coating composition should preferably amount to between about 6.8 and 7.5. The viscosity of the coating composition increases with decreasing pH-value and decreases with increasing pH-value.

In order to promote dilutability with water and to make the concentrated resins easier to handle, the coating compositions according to the invention may also contain solvents, as is also the case with conventional coating compositions. As is the case with conventional coating compositions, the upper limit for organic solvents amounts to about 10% by weight and preferably to about 5% by weight, based on the total quantity of aqueous coating composition. Viscosity is reduced by using solvents which are infinitely miscible with water, for example alcohols such as methanol, isopropanol or sec-butanol, the semiethers of glycols, such as ethylene glycol monoethyl ether or ethylene glycol monobutyl ether, or keto alcohols such as diacetone alcohol. The viscosity anomaly in the form of a "water mountain" which occurs during dilution may be influenced particularly favorably by adding solvents with limited solubility in water, such as n-butanol, amylalcohol, isophorone or methyl isobutyl ketone, which has a particularly favorable effect upon the dilutability of the resins. By adding small quantities e.g. up to 2% v/v of the bath of aromatic e.g. toluene, xylene, and aliphatic e.g. $C_6$–$C_{10}$ hydrocarbons of suitable chain length, it is possible more effectively to disperse the non-aqueous resin constituents in the aqueous phase, to increase their stability and to improve the fluidity of the deposited film. Because the deposition voltage is reduced by the organic solvents added, it is desirable to use as little organic solvent as possible.

EXAMPLES

Comparative Example 3000 g of 1,4-cis-polybutadiene with an average molecular weight of 1500, 4 g of diphenyl amine derivative and 396 g of xylene are heated to 130° C in a flask protected against oxidation by a nitrogen atmosphere. Following the addition of 600 g of maleic acid anhydride, the contents of the flask are heated to 190°–200° C and are kept at that temperature until no more maleic acid anhydride can be detected by a drop test with dimethyl aniline. After cooling to 120° C, the solvent is distilled off in vacuo. Viscosity: 0.1 Pas, as measured on a 60% solution in p-xylene at 25° C. Acid number: 173.

Refill concentrate: 1600 g of the resin obtained are hydrolysed for 3 hours at 80° C with 72g of distilled water, followed by dilution with 166 g of a mixture of butyl glycol and sec. butanol (1:1). The product is readily processible and has a solids content of 90.2% by weight (15 minutes at 185° C in a recirculating air drying cabinet).

Precipitation bath: 221.7 g of the refill material are gradually diluted with 20.6 g of triethyl amine and 1758 g of distilled water. MEQ-value: 81 (MEQ-value = milli equivalents of amine per 100 g of solid resin.) Solids content: 10.3% by weight (measured by heating for 15 minutes to 185° C in a recirculating air drying cabinet). Degree of neutralisation: 47% (i.e. 47% of the carbonyl groups are neutalised). (In the following Examples, the values were determined in the same way). In a 2 liter glass beaker provided with a magnetic stirrer, two metal plates are arranged at a distance of 5.5 cm apart. The plate wired as cathode consists of bare iron. The anode is a Bonder 125 plate. The deposition voltages tested, reaching a dry film thickness of 25 $\mu$ for a deposition time of 2 minutes and a bath temperature of 30° C. The deposited film is stoved for 30 minutes at 175° C. The coated surface shows numerous craters. The deposition voltage is 150 volts.

EXAMPLE 1

1977 g of 1,4-cis-polybutadiene oil with an average molecular weight of 1500 and 210 g of a degraded synthetic rubber with an average molecular weight of 7000 are heated under nitrogen to 130° C with 3 g of a standard commercial-grade anti-ager of the phenylene diamine type and 300 g of xylene. Following the addition of 510 g of maleic acid anhydride, the mixture is heated to 190°–200° C and kept at that temperature until no more maleic acid anhydride can be detected. Following the addition of 300 g of 1,4-cis-polybutadiene oil with an average molecular weight of 3000, the mixture is boiled at around 150° C and, at the same time, the solvent is distilled off in vacuo. The reaction temperature is maintained until a viscosity of 0.4 to 0.5 Pas (as measured on a 60% solution in p-xylene at 25° C) is reached. Acid number: 165.

Refill concentrate: 2618 g of the resin obtained as described above are hydrolysed for 3 hours at 80° C with 117 g of distilled water. This is followed by the addition of 270 g of a mixture of butyl glycol and sec. butanol (1:1). Solids content: 87.4% by weight (as measured by heating for 15 minutes to 185° C in a recirculating air drying cabinet.

Deposition bath: 228.8 g of the refill material are gradually diluted with 19.7 g of triethyl amine and 1752 g of distilled water. MEQ value: 78. Solids content:

9.96% by weight. Degree of neutralisation: 47%. In this bath, the deposition voltage on Bonder 125 amounts to 470 volts for a dry film thickness of 25. The deposited film is stoved for 30 minutes at 175° C. The surface is satisfactorily smooth.

EXAMPLE 2

144 g of a styrene-isoprene block copolymer with an average molecular weight of about 15,000 are dissolved in 300 g of commercial grade xylene and filtered. This solution is heated under nitrogen to a temperature of 130° C with 3.0 of a standard commercial-grade anti-ager of the diaryl amine type and 1923 g of a 1,4-cis-polybutadiene with a molecular weight of about 1500. Following the addition of 480 g of maleic acid anhydride, the mixture is heated with stirring to 190°–200° C and kept at that temperature until no more maleic acid anhydride can be detected. The mixture is then cooled to 150° C and the solvent distilled off in vacuo. 450 g of 1,4-cis polybutadiene oil with an average molecular weight of 3000 are then added, followed by boiling for 1 hour at 150° C. After cooling to 80° C, the mixture is filtered. The following final values are measured: viscosity: 1.2 Pas (as measured on a 60% solution in p-xylene at 25° C); acid number: 168 mg KOH/g solids.

Refill concentrate: 2574 g of the resin obtained as described above are hydrolysed for 3 hours at 80° C with 115 g of distilled or deionised water. 265 g of a mixture of butyl glycol and sec. butanol (1:1) are then added. Solids content: 87.8% by weight (as measured by heating for 15 minutes to 185° C in a recirculating air drying cabinet). Deposition bath: 228 g of the refill material are gradually diluted with 19.7 g of triethyl amine and 1752 g of distilled water. The following values are measured: MEQ value 77.5; solids content: 10.0% by weight; degree of neutralisation: 46%. In this bath, the deposition voltage on Bonder 125 plates amounts to 270 volts for a dry film thickness of 25µ. The deposited film is stoved for 30 minutes at 175° C. The surface is satisfactorily smooth and hard.

EXAMPLE 3

1159 g of a 1,4-cis polybutadiene oil with an average molecular weight of about 1500 are heated under inert gas to a temperature of 130° C together with 180 g of commercial-grade xylene, 1 g of a standard commercial-grade anti-ager of the diaryl amine type, 140 g of cyclized rubber with an average molecular weight of about 3000 and 60 g of a degraded butadiene rubber with a molecular weight of about 7000. Following the addition of 320 g of maleic acid anhydride, the mixture is heated to 190°–195° C and kept at that temperature until no more free maleic acid anhydride can be detected. On cooling to 150° C, the solvent is distilled off in vacuo. 140 g of 1,4-polybutadiene oil with an average molecular weight of about 3000 are then added, followed by boiling for 1 hour at 180° C. On cooling to 80° C, the mixture is filtered and the following final values are measured: viscosity 1.3 Pas (as measured on a 60% solution in p-xylene at 25° C); acid number: 172 mg KOH/g solids.

Refill concentrate: 1471 g of the resin obtained as described above are hydrolysed for 3 hours at 80° C with 66 g of distilled or deionised water. 152 g of a mixture of butyl glycol and sec. butanol (1:1) are then added. Solids content: 87.8% by weight (as measured by heating for 15 minutes to 195° C in a recirculating air drying cabinet).

Deposition bath: 228 g of the refill material are gradually diluted with 20.2 g of triethyl amine and 1752 g of distilled water. The following values are measured: MEQ-value: 68; solids content: 10% by weight; degree of neutralisation: 40%. In this bath, the deposition voltage on Bonder 125 plates amounts to 475 volts for a dry film thickness of 25 µ. The deposited film is stoved for 30 minutes at 175° C. The surface is satisfactorily smooth.

EXAMPLE 4

1118 g of a polybutadiene oil (40% by weight of 1,2-vinyl groups, 14% by weight of 1,4-cis-, 40% by weight of 1,4-trans- and 10% by weight of terminal phenyl groups) with a molecular weight of about 1000 and 133 g of a degraded synthetic rubber with an average molecular weight of about 7000 are heated under nitrogen to 130° C with 1 g of a standard commercial-grade anti-ager of the p-phenylene diamine type and 170 g of commercial-grade xylene. Following the addition of 342 g of maleic acid anhydride, the mixture is heated to 190°–200° C and kept at that temperature until no more maleic acid anhydride can be detected. Following the addition of 125 g of 1,4-cis-polybutadiene oil with an average molecular weight of about 3000, the mixture is boiled for 1 hour at about 180° C and at the same time the solvent distilled off. The following values are measured: viscosity: 0.45 Pas (as measured on a 60% solution in p-xylene at 25° C); acid number: 192 mg KOH/g solids. 39 g of urea are then scattered in very slowly, as a result of which foaming occurs. The temperature is maintained at 180° to 190° C until no more carbon dioxide can be detected with baryta water in the inert gas passed over. The mixture is filtered while still hot and then cooled to 80° C. Final values: viscosity 7.5 Pas (as measured on a 50% solution in p-xylene at 25° C): acid number 164 KOH/g solids.

Refill concentrate: 1320 g of the resin obtained as described above are hydrolysed for 3 hours at 80° C with 59 g of distilled or deionised water. 136 g of a mixture of butyl glycol and sec. butanol (1:1) are then added. Solids content: 86.0% by weight (as measured by heating for 15 minutes to 185° C in a recirculating air drying cabinet).

Precipitation bath: 233 g of the refill material are gradually diluted with 12.1 g of triethyl amine and 1755 g of distilled or deionised water. The following values are measured: MEQ-value: 49; solids content: 10.1% by weight (as measured by heating for 15 minutes to 185° C in a recirculating air drying cabinet; degree of neutralisation 30%. In this bath, the deposition voltage on Bonder 125 plates amounts to 350 volts for a dry film thickness of 21µ. The deposited film is stoved for 30 minutes at 175° C. The surface is satisfactorily smooth and hard.

The term cyclized rubber as used in this specification si described inter alia in German Pat. No. 675,567; 705,399; and 706,912 and in Rompps Chemie Lexikon 7th edition, Franckh'sche Verlagshandlung Stuttgart, page 718.

The term "(meth)acrylic" is intended to comprise "acrylic" and/or "methacrylic". The average molecular weight given is the number average molecular weight approximately ±20% determined with the vapour pressure osmometer.

In the examples the 1,4;L -cis-polybutadiene with an average molecular weight of 1500 contains about by weight 75% 1,4-cis double bonds, 24% 1,4-trans-double bonds and 1% vinyl groups, and the one with an average molecular weight of 3000 contains about by weight 80% 1,4-cis-double bonds, 19% 1,4-trans-double bonds and 1% vinyl groups.

Suitable readily soluble diolefine block copolymers are thermoplastic rubber block copolymers which consist of three blocks in the configuration A-B-A. In general, "A" represents an amorphous polymer which has a glass transition temperature above room temperature, i.e. a thermoplastic, and "B" represents an amorphous polymer which has a glass transition temperature well below room temperature, i.e. a rubber. "A" represents preferably a polystyrene chain and "B" represents a polydiene (elastomeric) chain of eithe polybutandiene or polyisoprene. (The structure and fundamental properties of these polymers are discussed in detail by Holden, G., Bishop, E. T. and Legge, N.R., "Thermoplastic Elastomers". Journal of Polymer Science Part C, No. 26, pp. 37–57, 1969.)

What is claimed is:

1. A modified, water-dilutable conjugated diolefin polymer oil containing carboxyl groups, obtained by the steps including reacting an $\alpha, \beta$-unsaturated compound selected from a monocarboxylic acid, a dicarboxylic acid, a dicarboxylic anhydride, a dicarboxylic acid (semi) ester, a dicarboxylic acid (semi) amide, a dicarboxylic acid imide, and mixtures thereof, with an diolefin polymer oil component substantially free from carboxyl groups, wherein the modified polymer oil is prepared by reacting
   A. the reaction product of at least one of said $\alpha, \beta$-unsaturated compounds with a mixture containing
      a. from about 80 to 99 parts by weight, of a conjugated diolefin polymer oil substantially free from carboxyl groups with an average molecular weight of from about 500 to 2500, and
      b. from about 1 to 20 parts by weight, of an olefin polymer oil substantially free from carboxyl groups, selected from degraded rubber, liquid butadiene copolymer and a readily soluble diolefin block copolymer, having an average molecular weight of from about 4500 to 20,000, with
   B. from about 3 to 15 parts by weight, based on 100 parts by weight of component A of a liquid conjugated diolefin polymer oil substantially free from carboxyl groups which has not been reacted with said $\alpha, \beta$-unsaturated compound and the average molecular weight of which is between the average molecular weights of components (Aa) and (Ab).

2. The modified polymer oil as defined in claim 1, wherein the average molecular weight of component (Aa) amounts to at least about 800.

3. The modified polymer oil as defined in claim 2, wherein the average molecular weight of component (Aa) amounts to at most about 2000.

4. The modified polymer oil as defined in claim 3, wherein the average molecular weight of component (Ab) amounts to at least about 5000.

5. The modified polymer oil as defined in claim 4, wherein the average molecular weight of component (Ab) amounts to at most about 15,000.

6. The modified polymer oil as defined in claim 1, wherein the reaction products according to (A) are further reacted with urea or ammonia.

7. The modified polymer oil as defined in claim 1, wherein the conjugated diolefin polymer oil of component (Aa) is a 1,4-cis-polybutadiene oil.

8. The modified polymer oil as defined in claim 1, wherein the conjugated diolefin polymer oil of component B is a 1,4-cis-polybutadiene oil.

9. The modified polymer oil as defined in claim 1, wherein component (Ab) is a degraded synthetic butadiene rubber.

10. The modified polymer oil as defined in claim 1, wherein said modified conjugated diolefin polymer oil has a viscosity of from about 0.2 to 5 Pas, as measured on a 60% solution in p-xylene at 25° C.

11. The modified polymer oil of claim 1, wherein the amount of component (Aa) is between about 85 and 95 parts by weight, the amount of component (Ab) is between about 5 and 15 parts by weight and the amount of component (B) is between about 6 and 12 parts by weight.

12. The modified polymer oil of claim 5, wherein the average molecular weight of component (Aa) is between about 1000 and 1750 and the average molecular weight of component (Ab) is between about 6000 and 10,000.

13. The modified polymer oil of claim 10, wherein said viscosity is between about 0.4 to 2 Pas, as measured on a 60% solution in p-xylene at 25° C.

14. The modified polymer oil of claim 1,, wherein said $\alpha, \beta$-unsaturated compound is maleic acid anhydride.

15. In a process for the production of a modified, water-dilutable conjugated diolefin polymer oil containing carboxyl groups, including the step of reacting a reaction mixture comprising an $\alpha, \beta$-unsaturated compound selected from a monocarboxylic acid, a dicarboxylic acid, a dicarboxylic acid anhydride, a dicarboxylic acid (semi) ester, a dicarboxylic acid (semi) amide, and an olefin polymer oil substantially free from carboxyl groups, wherein the improvement comprises preparing said reaction mixture by reacting:
   A. a reaction product of at least one of said $\alpha, \beta$-unsaturated compounds with a mixture containing
      a. 80 to 99 parts by weight, of a conjugated diolefin polymer oil substantially free from carboxyl groups having an average molecular weight of from 500 to 2500, and
      b. 1 to 20 parts by weight, of a olefin polymer oil substantially free from carboxyl groups selected from a degraded rubber, a liquid butadiene copolymer and a readily soluble diolefin block copolymer, having an average molecular weight of from 4500 to 20,000; and
   B. 3 to 15 parts by weight, based on 100 parts by weight of component A, of a liquid conjugated diolefin polymer oil substantially free from carboxyl groups which has not been reacted with said $\alpha, \beta$-unsaturated compound and the average molecular weight of which is between the average molecular weights of components (Aa) and (Ab).

16. In an aqueous coating composition, more especially for electro-dip-lacquering, containing a binder dilutable with a solvent selected from water and mixtures of water and organic solvent by neutralisation with a base, wherein the improvement comprises said binder comprising the modified, water-dilutable diolefin polymer oil containing carboxyl groups, as defined by claim 1.

17. The composition as defined by claim 16, further comprising a second compatible synthetic resin.

* * * * *